(12) United States Patent
Fallon et al.

(10) Patent No.: US 9,148,532 B2
(45) Date of Patent: Sep. 29, 2015

(54) AUTOMATED USER PREFERENCES FOR A DOCUMENT PROCESSING UNIT

(75) Inventors: Michael F. Fallon, Tiverton, RI (US); Myles Wilde, Charlestown, MA (US); Matthew J. Adiletta, Bolton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/995,405

(22) PCT Filed: Dec. 28, 2011

(86) PCT No.: PCT/US2011/067525
§ 371 (c)(1),
(2), (4) Date: Jun. 18, 2013

(87) PCT Pub. No.: WO2013/100952
PCT Pub. Date: Jul. 4, 2013

(65) Prior Publication Data
US 2014/0029028 A1    Jan. 30, 2014

(51) Int. Cl.
G06F 3/12 (2006.01)
H04N 1/00 (2006.01)
H04N 1/44 (2006.01)

(52) U.S. Cl.
CPC .......... *H04N 1/00395* (2013.01); *G06F 3/1204* (2013.01); *G06F 3/1257* (2013.01); *G06F 3/1285* (2013.01); *H04N 1/00336* (2013.01); *H04N 1/00342* (2013.01); *H04N 1/00421* (2013.01); *H04N 1/00474* (2013.01); *H04N 1/00482* (2013.01); *H04N 1/00498* (2013.01); *H04N 1/00514* (2013.01); *H04N 1/00517* (2013.01); *H04N 1/442* (2013.01); *H04N 1/4426* (2013.01); *H04N 1/4433* (2013.01)

(58) Field of Classification Search
None
See application file for complete search history.

(56) References Cited

U.S. PATENT DOCUMENTS

| | | | |
|---|---|---|---|
| 8,553,245 B2 * | 10/2013 | Sakagami et al. | 358/1.14 |
| 2005/0138573 A1 * | 6/2005 | Mathieson | 715/809 |
| 2007/0067269 A1 * | 3/2007 | Rudge et al. | 707/3 |
| 2008/0204805 A1 * | 8/2008 | Ming | 358/1.16 |
| 2008/0235276 A1 | 9/2008 | Erol et al. | |
| 2008/0273226 A1 | 11/2008 | Adachi et al. | |
| 2009/0044254 A1 * | 2/2009 | Tian | 726/4 |
| 2010/0046020 A1 * | 2/2010 | Chung et al. | 358/1.13 |
| 2012/0147423 A1 * | 6/2012 | Matsuba | 358/1.15 |
| 2012/0268773 A1 * | 10/2012 | Collins et al. | 358/1.15 |

OTHER PUBLICATIONS

"PCT Notification of Transmittal of the International Search Report and the Written Opinion of the International Searching Authority, or the Declaration", dated Sep. 5, 2012, for International Application No. PCT/US2011/067525, 9pgs.
"Notification Concerning Transmittal of International Preliminary Report on Patentability Chapter 1 of the Patent Cooperation Treaty", Jul. 10, 2014, for International Application No. PCT/US2011/067525, 6pgs.

* cited by examiner

*Primary Examiner* — Dung Tran
(74) *Attorney, Agent, or Firm* — Buckley, Maschoff & Talwalkar LLC

(57) ABSTRACT

According to some embodiments, a document processing unit may receive information associated with a document to be processed. The document processing unit might comprise, for example, a printer, scanner, copier, facsimile machine, or multi-function device. The document processing unit may then determine a user identifier indicating a user associated with the document to be processed. At least one user preference value associated with the user may then be automatically retrieved, and the document may be processed in accordance with the user preference value.

23 Claims, 9 Drawing Sheets

AUTOMATED USER PREFERENCES FOR A DOCUMENT PROCESSING UNIT

BACKGROUND OF THE INVENTION

Different users may operate and/or use a document processing unit, such as a printer or scanner, in different ways. For example, a first user might generally prefer to print documents on 8½ by 11 inch paper while a second user generally prefers A4 paper. As another example, a particular user might frequently scan documents and send copies of each document to a particular distribution list (e.g., a predetermined set of email addresses).

Typically, a user will control operation of a document processing unit by entering and/or selecting options via a control panel (e.g., a keypad or touchscreen). For example, a user might select a paper size, print quality, etc. via a keypad on a printer or scanner. Similarly, a user might enter email addresses, select electronic folders, etc., via the control panel to indicate where documents should be stored. Such an approach, however, can be a time consuming process that a user might need to repeat many times. Moreover, the approach may be error prone and could lead to, for example, a copy of a document being transmitted to an unintended recipient.

Thus, it can be difficult to efficiently and accurately control the operation of a document processing unit, especially when a relatively large number of people, documents, and/or document processing units are involved.

DETAILED DESCRIPTION OF EXAMPLE EMBODIMENTS

Figure 1:
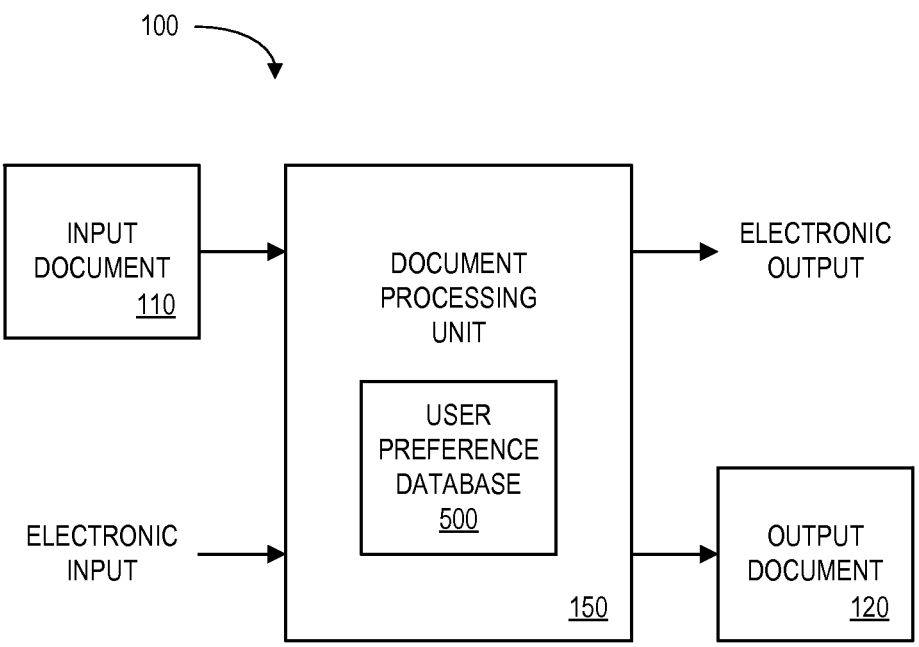
FIG. 1 is a block diagram of a system in accordance with some embodiments.

FIG. 1 is a block diagram of a system 100 that includes a document processing unit 150 in accordance with some embodiments. The document processing unit 150 may facilitate a collection and/or exchange of information. The document processing unit 150 might comprise a scanner that receives a paper input document 110 and creates an electronic output version (e.g., a bitmap image) of that document 110. As another example, the document processing unit 150 might comprise a printer that receives an electronic input (e.g., from a remote networked computer) and prints a paper output document 120. As still other examples, the document processing unit 150 might comprise a copier (e.g., that receives a paper input document 110 and generates an identical paper output document 120) or a facsimile machine (e.g., that receives the paper input document 110 and transmits a signal via a telephone line to reproduce the document at a remote location).

Different users may operate and/or use the document processing unit 150 in different ways. For example, a first user might generally prefer to print documents on 8½ by 11 inch paper while a second user generally prefers A4 paper. An another example, a particular user might frequently scan paper input documents 110 and send electronic copies of output documents 120 to a particular distribution list (e.g., a predetermined set of email addresses).

Typically, a user will control operation of the document processing unit 150 by entering and/or selecting options via a control panel (e.g., a keypad or touchscreen). For example, a user might select a paper size, print quality, etc. via a keypad on the document processing unit 150. Similarly, a user may enter email addresses, select electronic folders, etc., via the control panel to indicate where output documents 120 should be stored. Such an approach, however, can be a time consuming process that a user might need to repeat many times. Moreover, the approach may be error prone and could lead to, for example, a copy of a document being transmitted to an unintended recipient. Thus, it can be very difficult to efficiently and accurately control the operation of a document processing unit, especially when a relatively large number of people, documents, and/or document processing units 150 are involved.

Accordingly, a method and mechanism to efficiently, accurately, and automatically help control the operation of the document processing unit 150 may be provided in accordance with some embodiments described herein. In particular, the document processing unit 150 of FIG. 1 includes a user preference database 500 that may store one or more user preferences associated with the copying and/or creation of input documents 110 and output documents 120. For example, the user preference database 500 might store information indicating a print quality typically preferred by a user. According to other embodiments, a set of communication addresses may be stored as a default distribution list in association with a particular user.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, including the document processing unit 150, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

All systems and processes discussed herein may be embodied in program code stored on one or more non-transitory computer-readable media. Such media may include, for example, a floppy disk, a CD-ROM, a DVD-ROM, magnetic tape, solid state Random Access Memory ("RAM") or Read Only Memory ("ROM") storage units. Embodiments are therefore not limited to any specific combination of hardware and software.

Figure 2:
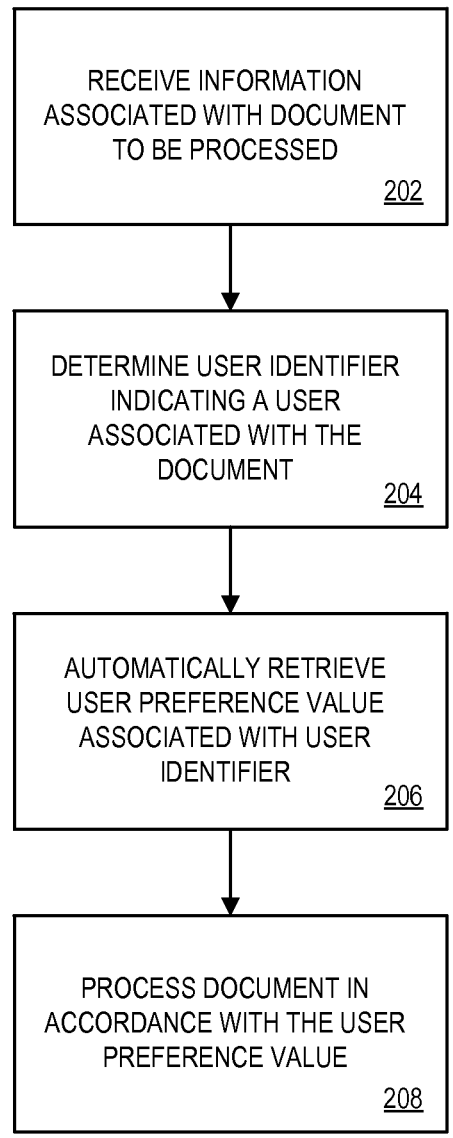
FIG. 2 is a flow diagram illustrating a method in accordance with some embodiments.

FIG. 2 is a flow diagram of a process 200 that might be associated with the document processing unit 150 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At 202, a "document processing unit" may receive information associated with a document to be processed. As used herein, the phrase "document processing unit" might refer to, for example, a printer, a scanner, a copier, a facsimile machine, and/or a multi-function document processing unit (e.g., that acts as both a printer and a copier).

At 204, the document processing unit may determine a user identifier indicating a user associated with the document to be processed. For example, a user might enter the user identifier via a keypad of a document processing unit, such as by entering a Personal Identification Number ("PIN") value, a username, and/or his or her password. As another example, the user identifier might be read from a magnetic stripe card swiped by user through a magnetic card reader or be received from a Radio Frequency Identification ("RFID") data signal. As still another example, the document processing unit might determine the user identifier by exchanging information with a mobile user device, such as a wireless telephone, smartphone, and/or a tablet computer.

According to some embodiments, a document processing unit might determine a user identifier via biometric information. For example, a camera and/or other types of sensors could be used to determine a user identifier based on his or her fingerprint, facial recognition, and/or voice recognition.

At 206, the document processing unit may "automatically" retrieve at least one user preference value associated with the user identifier (e.g., from a user preference database). As used herein, an action may be "automatic" if it requires little or no human intervention. Moreover, as used herein the phrase "user preference" may refer to, for example, any of a document destination, a document source, and/or a pre-determined list of communication addresses (e.g., telephone numbers, physical printers, email addresses, or electronic folder). For example, a scanner might determine that a particular user prefers to send copies of documents he or she scans to a supervisor's email address.

Other examples of user preferences include a number of documents (e.g., unless told otherwise, the printer should always print three copies of documents scanner by Mr. Brown), a default scan resolution, a default print quality, default size information, default side information (e.g., single or double sided copies), and/or a default language (e.g., whether options and/or help information should be displayed in English or Spanish). According to some embodiments, user preferences might be associated with user history information (e.g., default values might be automatically determined for a user based on past usage of the document processing unit), an authentication process, user privilege information, and/or user access rights.

At 208, the document may be processed in accordance with the user preference value. For example, a document processing unit might automatically transmit copies of a scanned document to a predetermined list of email addresses. According to some embodiments, the processing of the document is further based on document content. For example, an Optical Character Recognition ("OCR") process might be employed such that all documents scanned by Ms. Jones that include the word "INVOICE" are automatically printed in duplicate. As other examples, the processing of the document might be further based on a time of day, a day of week, and/or a date. For example, when Mr. West copies documents on Monday mornings before noon, twelve copies of the document might be automatically printed.

Figure 3:
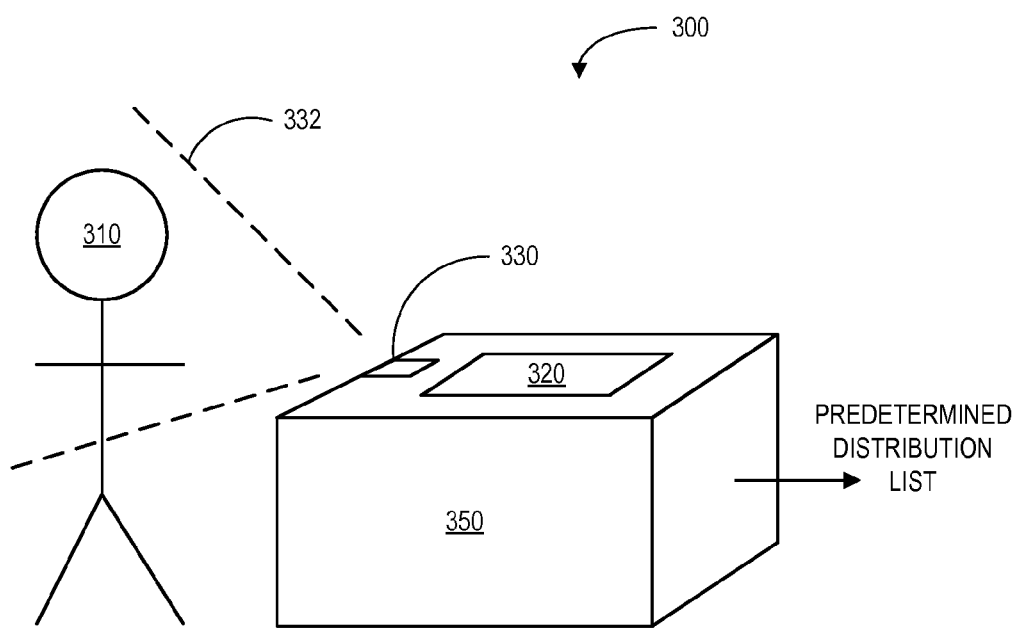
FIG. 3 illustrates use of a document processing unit according to some embodiments.

FIG. 3 illustrates use 300 of a document processing unit 350 according to some embodiments. In this example, a user 310 places a paper document 320 on the document processing unit 350. The document processing unit 350 includes a camera 330 that captures an image of the user 310 within its field of view 332. The document processing unit 350 may then analyze the image to determine a user identifier associated with the user 310 along with a set of preferences that he or she had previously established. The document processing unit 350 may then process the document 320 in accordance with those preferences (e.g., by automatically transmitting a copy of the document to his or her personal electronic folder).

Note that the user identifier might be based on, for example, a communication between a document processing unit and a user device, such as a user's smartphone, RFID keychain, or employee card with a magnetic stripe. According to other embodiments, biometric information (e.g., a fingerprint) or facial recognition process may be used to determine a user identifier. Note that application of a user preference may be based on a user's title or role in a company. For example, copies of documents printed by a person working in human resources department might be automatically stored (e.g., within an archive) while documents printed by other employees are not.

According to some embodiments, the application of a user preference may be based at least in part on a processing function type. For example, a preference might indicate that a certain type of document should automatically be saved on a user's desktop when it is printed but not when it is sent via facsimile.

Note that in the example of FIG. 1, the user preference value is retrieved from the user preference database 500 stored local to the document processing unit 150. In this case, the user preference database 500 might be entered by a user (e.g., via a printer's keypad or a web based user interface), installed by an administrator, and/or may be automatically updated when needed or on a periodic basis (e.g., each night).

Figure 4:
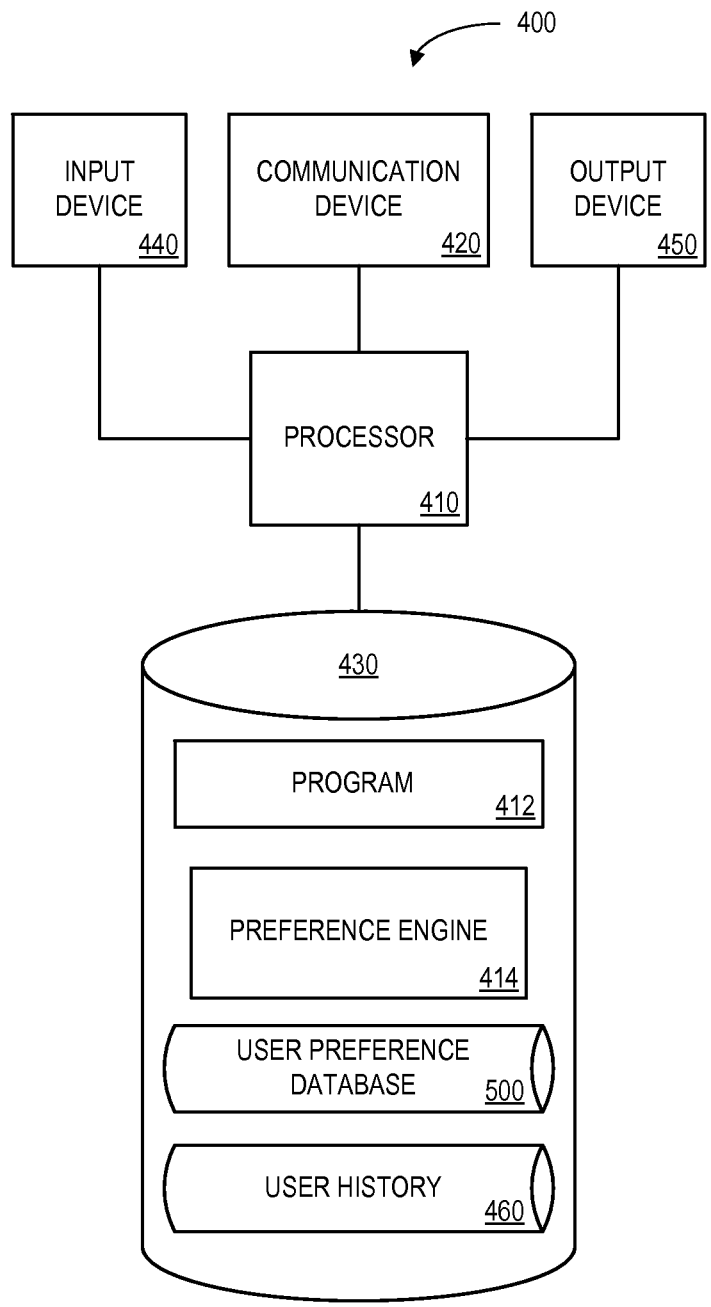
FIG. 4 is a block diagram of document processing unit according to some embodiments.

FIG. 4 is a block diagram overview of a document processing system 400 according to some embodiments. The document processing system 400 may be, for example, associated with the system 100 described with respect to FIG. 1. The document processing system 400 comprises a processor 410, such as one or more commercially available Central Processing Units (CPUs) in the form of one-chip microprocessors, coupled to a communication device 420 configured to communicate via a communication network (not shown in FIG. 4). The communication device 420 may be used to communicate, for example, with one or more remote computers, servers, or facsimile machines. The document processing system 400 further includes an input device 440 (e.g., a motion sensor, touchscreen, and/or keyboard to receive information from a user who is processing a document, including user default values or preferences) and an output device 450 (e.g., a computer monitor and/or printer to provide information to a user).

The processor 410 communicates with a storage device 430. The storage device 430 may comprise any appropriate information storage device, including combinations of magnetic storage devices (e.g., a hard disk drive), optical storage devices, and/or semiconductor memory devices. The storage device 430 stores a program 412 and/or preference engine 414 for controlling the processor 410. The processor 410 performs instructions of the programs 412, 414, and thereby operates in accordance with any of the embodiments described herein. For example, the processor 410 may receive information associated with a document to be processed. The processor 410 may then determine a user identifier indicating a user associated with the document to be processed. At least one user preference value associated with the user may then be automatically retrieved by the processor, and the document may be processed in accordance with the user preference value.

The programs 412, 414 may be stored in a compressed, uncompiled and/or encrypted format. The programs 412, 414 may furthermore include other program elements, such as an operating system, a database management system, and/or device drivers used by the processor 410 to interface with peripheral devices.

As used herein, information may be "received" by or "transmitted" to, for example: (i) the document processing system 400 from another device; or (ii) a software application or module within the document processing system 400 from another software application, module, or any other source.

In some embodiments (such as shown in FIG. 4), the storage device 430 stores a user preference database 500 (described with respect to FIG. 5) and a user history database 460 (e.g., to automatically infer user preferences). An example of a database that may be used in connection with the document processing system 400 will now be described in detail with respect to FIG. 5. Note that the database described herein is only one example, and additional and/or different information may be stored therein. Moreover, various databases might be split or combined in accordance with any of the embodiments described herein.

Figure 5:
FIG. 5 is a portion of a tabular representation of a user preference database in accordance with some embodiments.

Referring to FIG. 5, a table is shown that represents the user preference database 500 that may be stored at the document processing system 400 according to some embodiments. The table may include, for example, entries identifying users that may utilize a document processing unit. The table may also define fields 502, 504, 506, 508 for each of the entries. The fields 502, 504, 506, 508 may, according to some embodiments, specify: a user identifier 502, a distribution list 504, user preferences 506, and quality 508. The information in the user preference database 500 may be created and updated, for example, based on data received from a user.

The user identifier 502 may be, for example, a unique alphanumeric code identifying a person, such as an employee, who might interact with a document processing unit. The distribution list 504 might comprise, for example, a set of communication addresses that should automatically receive a copy of a document when scanned by that particular user. The user preferences 506 may include values, such as default parameters, rules, etc., associated with operation of a document processing unit. For example, the user preference 506 for user "U1003" indicates that a watermark should be added when he or she scans a document and the file created for that document should be automatically encrypted. As another example, the user preference 506 for user "U1004" defines that ten copies of a document should be automatically printed if the document name includes the word "MEMO."

Figure 6:
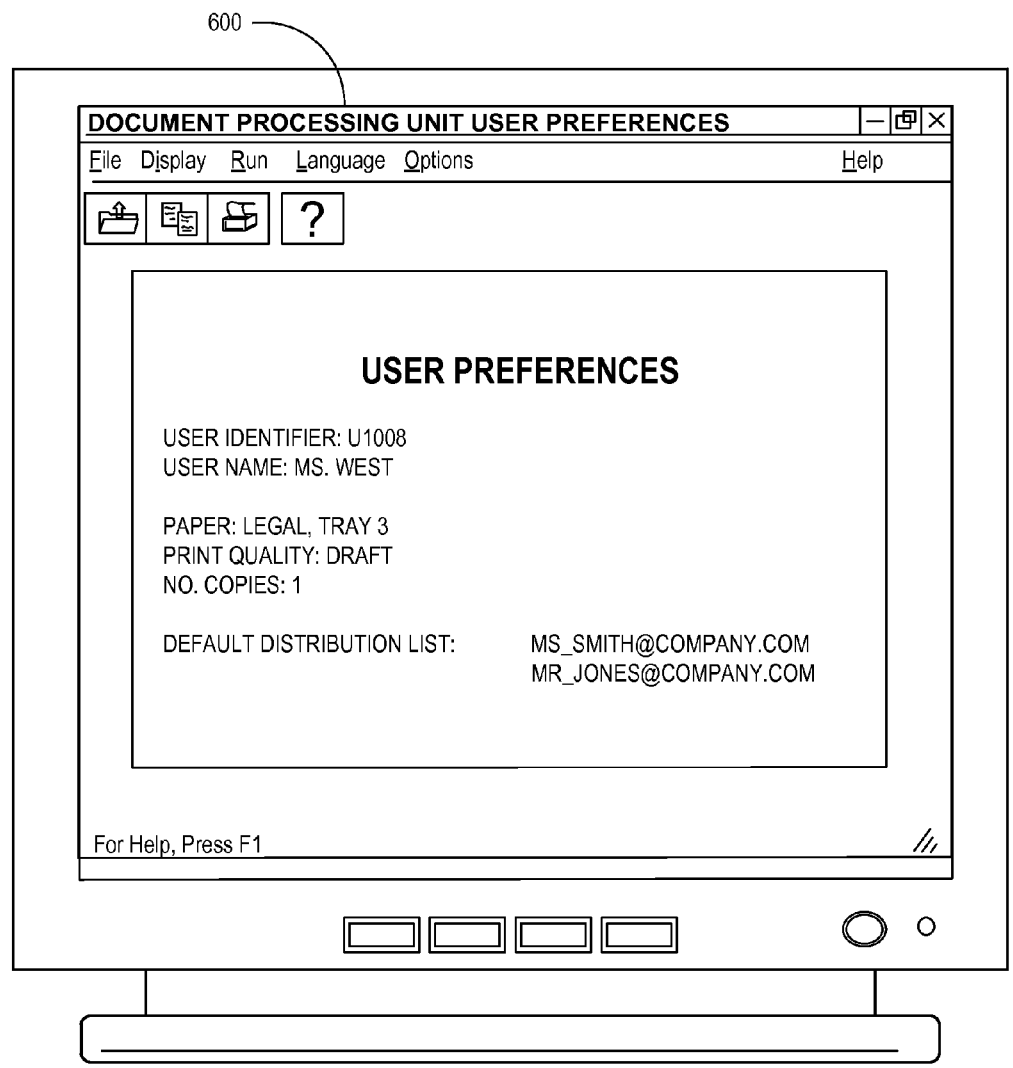
FIG. 6 is an example of a document processing unit user preference definition display according to some embodiments.

According to some embodiments, the user preference database 500 further includes the quality 508 which might indicate, for example, a number of pixels or dots-per-inch that should be used when printing or scanning a document. The information in the user preference database 500 may, according to some embodiments, be entered and/or adjusted by a user. For example, FIG. 6 is an example of a document processing unit user preference definition display 600 according to some embodiments. The display 600 might be used, for example, to inform a user about his or her current preferences and/or to let the user change those preferences (e.g., by adding new email address to a default distribution list).

Figure 7:
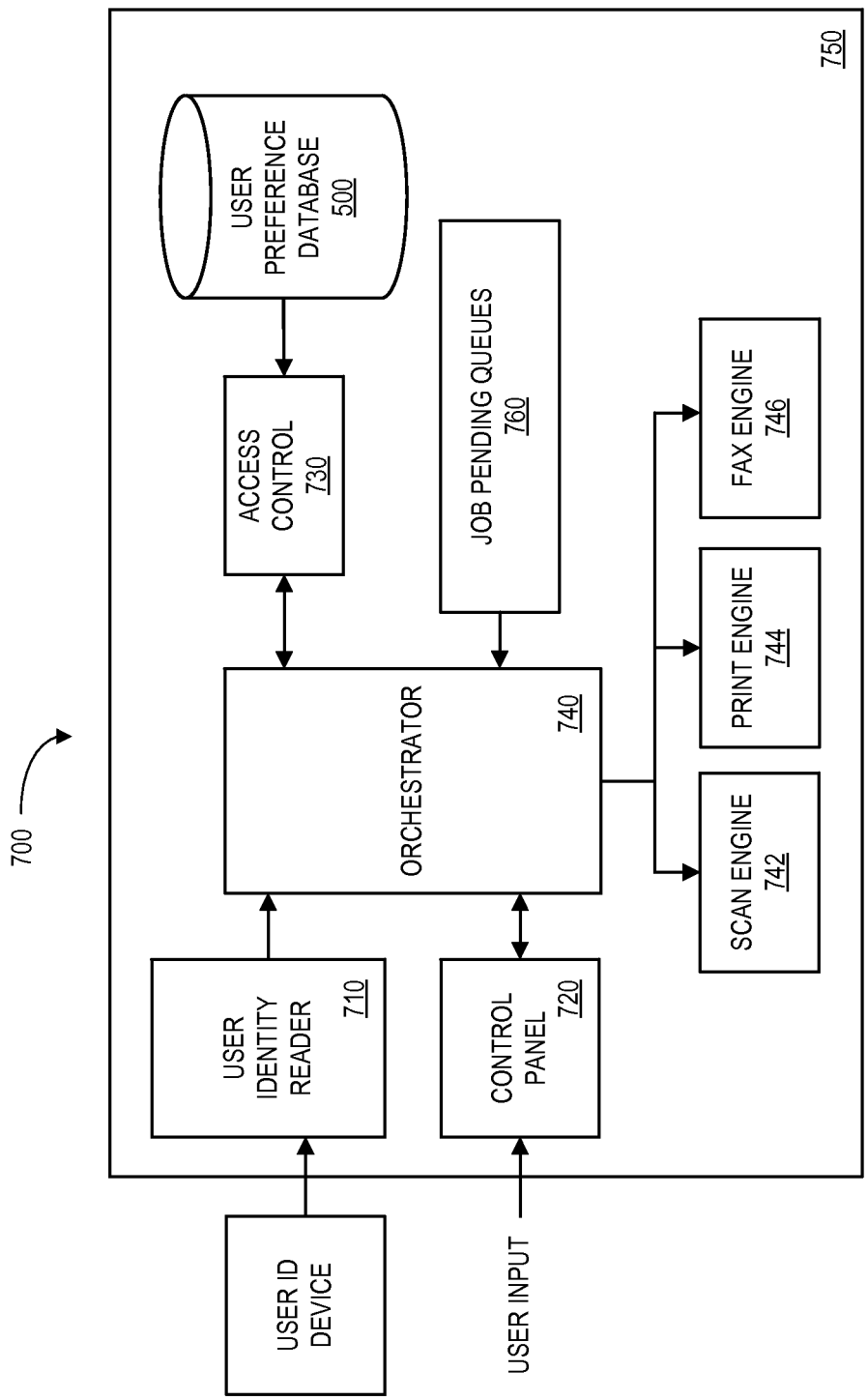
FIG. 7 is a block diagram of a document processing system according to some embodiments.

Note that embodiments described herein might be implemented using any number of different architectures. FIG. 7 is a block diagram of a document processing system 700 according to some embodiments. In particular, the system 700 may enable a document processing unit 750, such as a printer, copier, fax machine, scanner, and/or multi-function device to automatically determine apply preference setting for a user. The document processing unit 750 may, for example, receive a paper document via an optical scanner and/or receive an electronic document via a remote computer device (e.g., a personal computer or server).

According to some embodiments, the document processing unit 750 may include a user identity reader 710 that receives data from a user identifier device to identify a current user (e.g., an employee RFID enabled badge, a cell phone, or entering a username and PIN via a control panel 720). An orchestrator 740 may provided, for example, to operate as a command and control center of the document processing device 750. The orchestrator 740 may, for example, control all user interaction, drive imbedded hardware engines (e.g., a scan engine 742, a print engine 744, and a fax engine 746), manage job pending queues 760, and help a user have an efficient and pleasurable document processing experience.

An access control 730 component may be responsible for user account management including user authentication, granting access rights and/or user privilege control. According to some embodiments the access control 730 may receive information from a user preference database 500 that maintains users' personal information, such as contact lists and personal preferences such as default scan resolution, print quality, etc.

By way of example, a user might swipe an RFID card through the user identity reader 710 identify his or herself and gain access to the document processing system 750. The orchestrator 740 may send the user identifier to the access control 730 component for validation. The access control 730 component may confirm the validity of user identifier and send his or her personal settings to the orchestrator 750. The orchestrator 750 may then check job pending queues 760 to see if there are any pending print or fax jobs for the. The orchestrator 750 may, according to some embodiments, inform the user via the control panel 720 that a fax has arrived. The user may select a "print fax now" icon on the control panel 720, and the orchestrator 750 may send a print job to the print engine 754 and automatically save a copy of the fax to the user's electronic folder stored on a company server.

According to some embodiments, the document processing unit 750 also includes an OCR platform to detect handwritten, typewritten, or printed text in a scanned document and output the data in a machine-encoded text to the orchestrator. Note that paper documents might be input to the document processing unit 750 via an optical scanner, and electronic documents may be sent to the document processing unit 750 via a computer device, such as computer network. The input format of these documents may not be consistent with the format required by various components of the document processing system 750. As a result, a document format converter may convert an input document format into a format that is consumable by the components of the document processing system 750.

Figure 8:
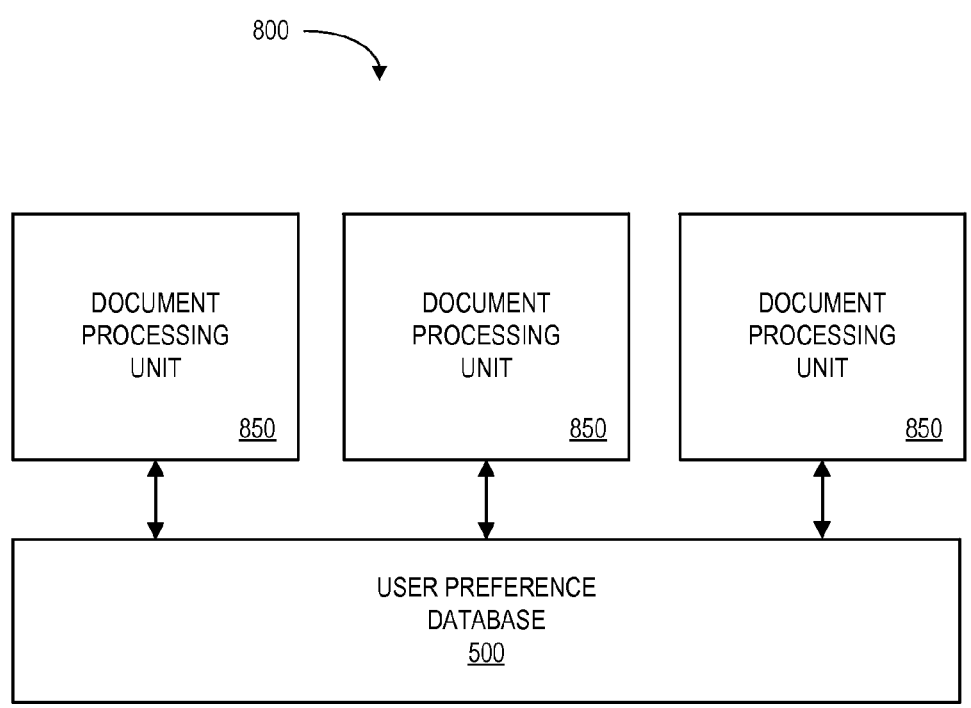
FIG. 8 illustrates a network in accordance with some embodiments.

Note that in the example of FIG. 1, the pre-determined user preference is retrieved from the user preference database 500 stored local to the document processing unit 150. According to some embodiments, a user preference is received from a user preference database stored remote from the document processing unit, and the user preference database is accessed by a plurality of document processing units. FIG. 8 illustrates a network 800 in accordance with some embodiments. The network includes a single user preference database 500 accessed by multiple document processing units 850. In this way, only a single entry may need to be update to change a user preference. Moreover, consistency between the document processing units 850 may be insured. According to this embodiment, each document processing unit 850 may access the user preference database 500 as needed (e.g., using a request-response model or a nightly download of preferences).

Figure 9:
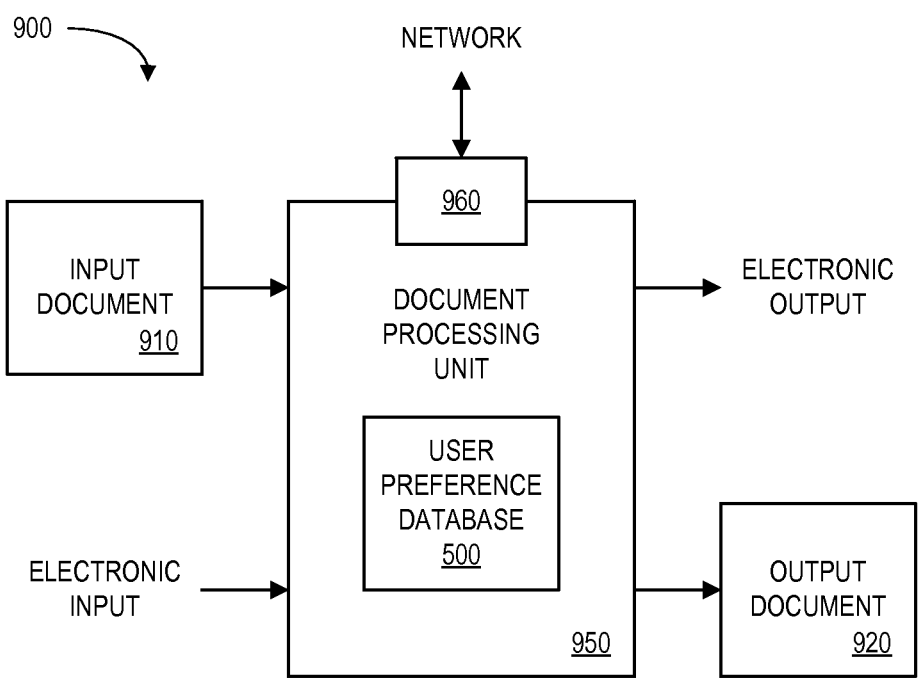
FIG. 9 is a block diagram of a system according to some embodiments.

FIG. 9 is a block diagram of a system 900 according to some embodiments. The system includes a document processing unit 950 with a user preference database 500 (e.g., storing at least one user preference). The document processing unit 950 may receive input documents 910 and/or create output documents 920 as appropriate. Moreover, the document processing unit 950 may: (i) receive information associated with a document to be processed, (ii) determine that the user identifier is associated with the document to be processed, (iii) retrieve the user preference value associated with the user identifier from the user preference database, and (iv) process the document in accordance with the user preference value. According to some embodiments, the document processing unit 950 further includes a network interface component 960 and may exchange data associated with the document to be processed via the network interface component 960.

Accordingly, a method and mechanism to efficiently, accurately, and automatically help operate a document processing system for a user may be provided in accordance with some embodiments described herein.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of user preferences, note that embodiments may be associated with other types of user preferences. For example, a user preference might be associated with a set of users (e.g., all employees who work in a human resources department might be associated with a certain preference) or a job title. Moreover, while embodiments have been illustrated using particular ways of applying preferences to paper documents, note that embodiments might be associated with audio and/or video information (e.g., displayed on a monitor, captured via a web video camera, and/or spoken over a telephone).

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
receiving, at a document processing unit, information associated with a document to be processed;
determining, by a computer processor of the document processing unit, a user identifier indicating a user associated with submitting the document to be processed to the document processing unit, wherein the determination is based at least in part on biometric information of the user;
automatically retrieving, by the computer processor, at least one user preference value associated with the biometrically-determined user identifier, wherein the user preference value was previously automatically determined by the computer processor based on the user's history of document processing usage; and
processing the document, by the computer processor, in accordance with the user preference value.

2. The method of claim 1, wherein the document processing unit comprises at least one of: (i) a printer, (ii) a scanner, (iii) a copier, (iv) a facsimile machine, or (v) a multi-function document processing unit.

3. The method of claim 1, wherein the determination of the user identifier is associated with at least one of: (i) entry of the user identifier by the user via a keypad of the document processing unit, (ii) a personal identification number, (iii) a username, (iv) a password, (v) a magnetic stripe card, (vi) radio frequency identification data, (vii) a mobile user device, (viii) a wireless telephone, (ix) a smartphone, or (x) a tablet computer.

4. The method of claim 1, wherein the determination of the user identifier is associated with at least one of: (i) a fingerprint, (ii) facial recognition, or (iii) voice recognition.

5. The method of claim 1, wherein the user preference value comprises at least one of: (i) a document destination, (ii) a document source, (iii) a pre-determined list of communication addresses, (iv) email addresses, or (v) an electronic folder.

6. The method of claim 1, wherein the user preference value comprises at least one of: (i) a number of documents, (ii) a default scan resolution, (iii) a default print quality, (iv) default size information, (v) default side information, (vi) a default language, (vii) an authentication process, (viii) user privilege information, or (ix) user access rights.

7. The method of claim 1, wherein the processing of the document is further based on at least one of: (i) a time of day, (ii) a day of week, or (iii) a date.

8. The method of claim 1, wherein the user preference value is retrieved from a user preference database stored local to the document processing unit.

9. The method of claim 1, wherein the user preference value is received from a user preference database stored remote from the document processing unit, wherein the user preference database is accessed by a plurality of document processing units.

10. A non-transitory computer-readable storage medium having stored thereon instructions that when executed by a machine result in the following:
receiving, at a document processing unit, information associated with a document to be processed;

determining, at the document processing unit, a user identifier indicating a user associated with submitting the document to be processed to the document processing unit, wherein the determination is based at least in part on biometric information of the user;

automatically retrieving at least one user preference value associated with the biometrically-determined user identifier, wherein the user preference value was previously automatically determined based on the user's history of document processing usage; and processing the document in accordance with the user preference value.

11. The medium of claim 10, wherein the document processing unit comprises at least one of: (i) a printer, (ii) a scanner, (iii) a copier, (iv) a facsimile machine, or (v) a multi-function document processing unit.

12. The medium of claim 10, wherein the determination of the user identifier is associated with at least one of: (i) entry of the user identifier by the user via a keypad of the document processing unit, (ii) a personal identification number, (iii) a username, (iv) a password, (v) a magnetic stripe card, (vi) radio frequency identification data, (vii) a mobile user device, (viii) a wireless telephone, (ix) a smartphone, or (x) a tablet computer.

13. The medium of claim 10, wherein the determination of the user identifier is associated with at least one of: (i) a fingerprint, (ii) facial recognition, or (iii) voice recognition.

14. The medium of claim 10, wherein the user preference value comprises at least one of: (i) a document destination, (ii) a document source, (iii) a pre-determined list of communication addresses, (iv) email addresses, or (v) an electronic folder.

15. The medium of claim 10, wherein the user preference value comprises at least one of: (i) a number of documents, (ii) a default scan resolution, (iii) a default print quality, (iv) default size information, (v) default side information, (vi) a default language, (vii) an authentication process, (viii) user privilege information, or (ix) user access rights.

16. An apparatus, comprising:
a user preference database storing a user preference value in connection with a biometrically-determined user identifier, wherein the user preference value was previously automatically determined by a computer processor based on a user's history of document processing usage; and
a document processing unit, coupled to the user preference database, to: (i) receive information associated with a document to be processed, (ii) determine that the user identifier is associated with a user who submits the document to be processed by the document processing unit, wherein the determination is based at least in part on biometric information of the user, (iii) retrieve the user preference value associated with the user identifier from the user preference database, and (iv) process the document in accordance with the user preference value.

17. The apparatus of claim 16, wherein the document processing unit comprises at least one of: (i) a printer, (ii) a scanner, (iii) a copier, (iv) a facsimile machine, or (v) a multi-function document processing unit.

18. The apparatus of claim 16, wherein the determination of the user identifier is associated with at least one of: (i) entry of the user identifier by the user via a keypad of the document processing unit, (ii) a personal identification number, (iii) a username, (iv) a password, (v) a magnetic stripe card, (vi) radio frequency identification data, (vii) a mobile user device, (viii) a wireless telephone, (ix) a smartphone, (x) a tablet computer, (xi) a fingerprint, (xii) facial recognition, or (xiii) voice recognition.

19. The apparatus of claim 16, wherein the user preference value comprises at least one of: (i) a document destination, (ii) a document source, (iii) a pre-determined list of communication addresses, (iv) email addresses, (v) an electronic folder, (vi) a number of documents, (vii) a default scan resolution, (viii) a default print quality, (ix) default size information, (x) default side information, (xi) a default language, (xii) an authentication process, (xiii) user privilege information, or (xiv) user access rights.

20. A system, comprising:
a network interface component;
a user preference database storing a user preference value in connection with a biometrically-determined user identifier, wherein the user preference value was previously automatically determined based on a user's history of document processing usage; and
a document processing unit, coupled to the network interface component and user preference database, to: (i) receive information associated with a document to be processed, (ii) determine that the user identifier is associated with a user who submits the document to be processed by the document processing unit, wherein the determination is based at least in part on biometric information of the user, (iii) retrieve the user preference value associated with the user identifier from the user preference database, and (iv) process the document in accordance with the user preference value.

21. The system of claim 20, wherein the document processing unit comprises at least one of: (i) a printer, (ii) a scanner, (iii) a copier, (iv) a facsimile machine, or (v) a multi-function document processing unit.

22. The system of claim 20, wherein the determination of the user identifier is associated with at least one of: (i) entry of the user identifier by the user via a keypad of the document processing unit, (ii) a personal identification number, (iii) a username, (iv) a password, (v) a magnetic stripe card, (vi) radio frequency identification data, (vii) a mobile user device, (viii) a wireless telephone, (ix) a smartphone, (x) a tablet computer, (xi) a fingerprint, (xii) facial recognition, or (xiii) voice recognition.

23. The system of claim 20, wherein the user preference value comprises at least one of: (i) a document destination, (ii) a document source, (iii) a pre-determined list of communication addresses, (iv) email addresses, (v) an electronic folder, (vi) a number of documents, (vii) a default scan resolution, (viii) a default print quality, (ix) default size information, (x) default side information, (xi) a default language, (xii) an authentication process, (xiii) user privilege information, or (xiv) user access rights.

* * * * *